(12) United States Patent
Muthiah et al.

(10) Patent No.: US 11,940,873 B2
(45) Date of Patent: Mar. 26, 2024

(54) LOW LATENCY PARITY FOR A MEMORY DEVICE

(71) Applicant: Western Digital Technologies, Inc., San Jose, CA (US)

(72) Inventors: Ramanathan Muthiah, Bangalore (IN); Vimal Kumar Jain, Bangalore (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 52 days.

(21) Appl. No.: 17/567,099

(22) Filed: Dec. 31, 2021

(65) Prior Publication Data

US 2023/0214291 A1  Jul. 6, 2023

(51) Int. Cl.
*G06F 11/00* (2006.01)
*G06F 3/06* (2006.01)
*G06F 11/07* (2006.01)
*G06F 11/10* (2006.01)
*G06F 11/14* (2006.01)

(52) U.S. Cl.
CPC ........ *G06F 11/1068* (2013.01); *G06F 3/0619* (2013.01); *G06F 3/064* (2013.01); *G06F 3/0656* (2013.01); *G06F 3/0679* (2013.01); *G06F 11/0757* (2013.01); *G06F 11/1489* (2013.01)

(58) Field of Classification Search
CPC .......................... G06F 11/1068; G06F 11/0757
See application file for complete search history.

(56) References Cited

U.S. PATENT DOCUMENTS

| | | | |
|---|---|---|---|
| 11,262,918 B1 * | 3/2022 | Venugopal | G06F 3/0616 |
| 2019/0114225 A1 * | 4/2019 | Gopalakrishnan | G06F 11/1068 |
| 2022/0357891 A1 * | 11/2022 | Wang | G06F 3/0629 |
| 2023/0057271 A1 * | 2/2023 | Stoica | G06F 11/3055 |

* cited by examiner

*Primary Examiner* — Philip Guyton
(74) *Attorney, Agent, or Firm* — Kunzler Bean & Adamson

(57) ABSTRACT

Apparatuses, systems, and methods for low latency parity for a memory device include a controller configured to accumulate, in a memory buffer, combined parity data for a plurality of regions of memory of a memory device in response to write operations for the plurality of regions of memory. The controller is configured to perform a recovery operation for a region of memory in response to determining that a latency setting for the region satisfies a latency threshold. The controller is configured to service a read request for data from the region based on a recovery operation to satisfy the latency setting.

17 Claims, 11 Drawing Sheets

LOW LATENCY PARITY FOR A MEMORY DEVICE

TECHNICAL FIELD

The present disclosure, in various embodiments, relates to memory devices and more particularly relates to low latency parity error correction for a memory device.

BACKGROUND

The amount of data accessed by host computers has steadily continued to grow. Many use cases for this data, such as video and gaming, may have timing requirements for the data. If data errors are encountered and cannot be quickly corrected, it may be too late to use the data, and video frames may be dropped, a videogame's frame rate may be reduced, or the like. For these use cases, data with errors may be ignored or discarded rather than attempting error correction.

SUMMARY

Apparatuses for low latency parity for a memory device are disclosed. In certain embodiments, an apparatus includes a controller for a memory device. A controller, in one embodiment, is configured to accumulate, in a memory buffer, combined parity data for a plurality of regions of memory of a memory device in response to write operations for the plurality of regions of memory. A controller, in a further embodiment, is configured to perform a recovery operation for a region in response to determining that a latency setting for the region satisfies a latency threshold. In some embodiments, a controller is configured to service a read request for data from a region based on a recovery operation to satisfy a latency setting.

Methods for low latency parity for a memory device are disclosed. In certain embodiments, a method includes accumulating, in a memory buffer, combined parity data for a plurality of blocks of memory of the memory device in response to write operations for the plurality of blocks of memory. A method, in a further embodiment, includes performing a recovery operation for a block of a plurality of blocks in response to determining that a latency setting for the block satisfies a latency threshold. In one embodiment, a method includes servicing a read request for data from a block based on a recovery operation to satisfy a latency setting.

Additional apparatuses for low latency parity for a memory device are disclosed. In some embodiments, an apparatus includes means for accumulating, in a memory buffer, combined parity data for a plurality of blocks of non-volatile memory of a non-volatile memory device in response to write operations for the plurality of blocks of non-volatile memory. An apparatus, in one embodiment, includes means for performing a recovery operation for a block of a plurality of blocks in response to determining that a latency setting for the block satisfies a latency threshold. In certain embodiments, an apparatus includes means for servicing a read request for data from a block based on a recovery operation to satisfy a latency setting.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
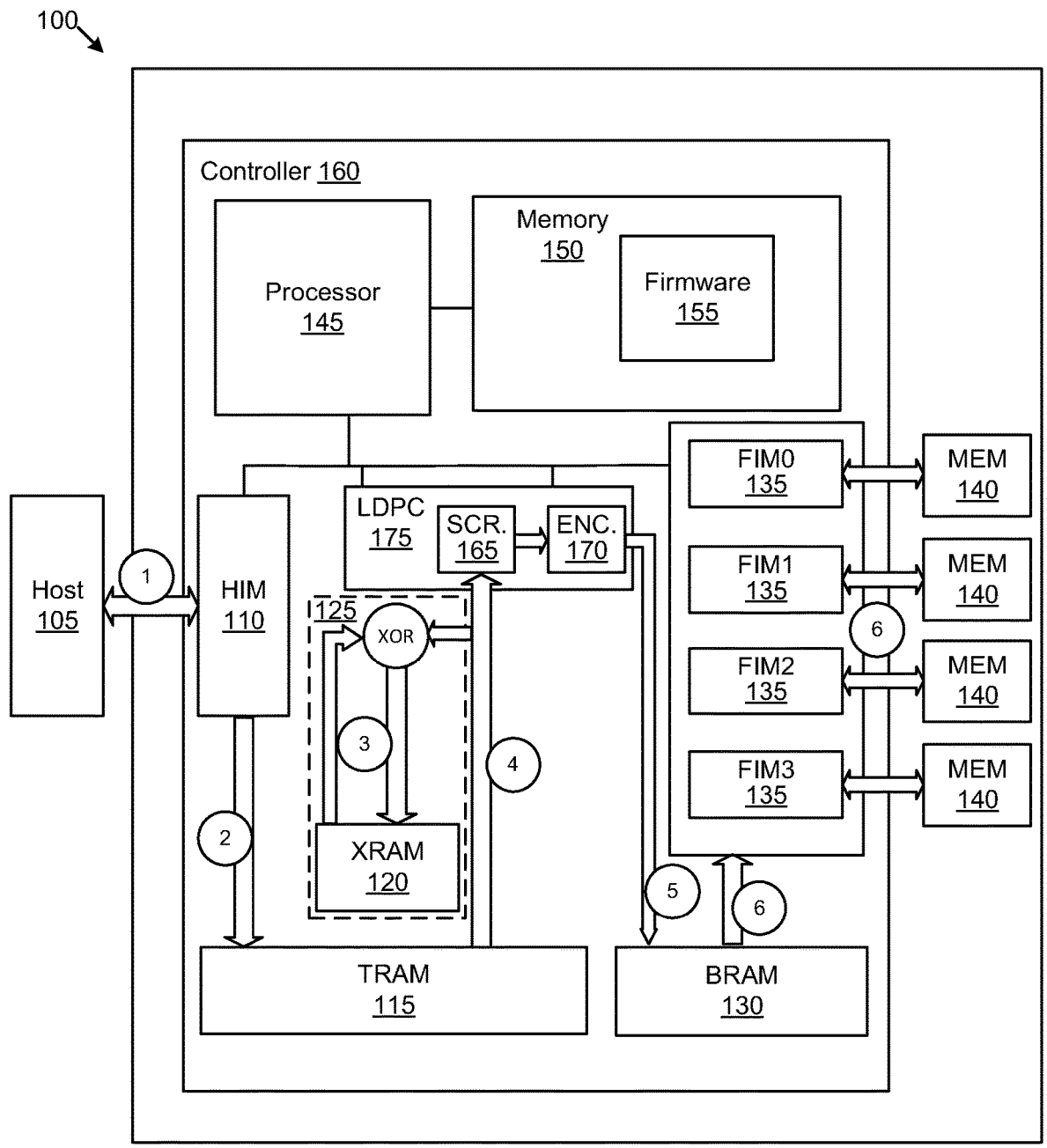
FIG. 1 illustrates one embodiment of a system for low latency parity for a memory device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "engine", "module," "apparatus," or "system." Furthermore, aspects of the present disclosure may take the form of a computer program product embodied in one or more non-transitory computer readable storage media storing computer readable and/or executable program code.

Some of the functional units described in this specification have been labeled as modules or engines, in order to more particularly emphasize their implementation independence. For example, a module or an engine may be implemented as a hardware circuit comprising custom VLSI circuits or gate arrays, off-the-shelf semiconductors such as logic chips, transistors, or other discrete components. A module or engine may also be implemented in programmable hardware devices such as field programmable gate arrays, programmable array logic, programmable logic devices, or the like.

Modules or engines may also be implemented at least partially in software for execution by various types of processors. An identified module or engine may, for instance, comprise one or more physical or logical blocks of computer instructions which may, for instance, be organized as an object, procedure, or function. Nevertheless, the executables of an identified module or engine need not be physically located together, but may comprise disparate instructions stored in different locations which, when joined logically together, comprise the module or the engine and achieve the stated purpose for the module or engine.

Indeed, a module or engine of executable code may include a single instruction, or many instructions, and may even be distributed over several different code segments, among different programs, across several memory devices, or the like. Where a module or engine or portions of a module or engine are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules or engines described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It may also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Similar or like numbers may refer to like elements in the figures, including alternate embodiments of like elements unless otherwise clear from context.

FIG. 1 depicts one embodiment of a memory device 100 that includes a controller 160 with a parity engine 125 and a parity buffer memory 120 for correcting data errors for memory 140. In general, the controller 160 may be configured to proactively perform a recovery operation, such as a de-XOR operation or other reverse parity operation, using parity data for a block or other region of the memory 140 (e.g., prior to data from the block or other region being requested, or the like), in order to satisfy a latency setting when data from the block or other region is requested.

For example, in one embodiment, the controller 160 may perform a recovery operation and cache the resulting data until receiving a read request for the data. In a further embodiment, the controller 160 may perform a recovery operation, remove invalid data, and determine new parity data which may be capable of being decoded faster than the original parity data due to the invalid data being removed, to reduce the latency of a subsequent recovery operation. In this manner, in certain embodiments, instead of simply discarding or disregarding data with errors if a latency setting does not allow enough time to perform a recovery operation (e.g., for video playback, real-time communication data, video games, or the like), the controller 160 may proactively correct errors and/or reduce latency of recovery operations, before the data is even requested.

As used herein, the term "parity engine" refers to an engine, circuit, module, or the like that computes and otherwise manipulates parity data (e.g., encodes data, decodes data, recovers data, or the like), such as an XOR engine. In some embodiments, the parity engine 125 may compute parity data for one or more blocks or other regions (e.g., a partial block, multiple blocks, a meta-block, or the like) of volatile and/or non-volatile memory 140. In at least one embodiment, the memory device 100 may efficiently control a volatile and/or non-volatile memory 140 using a controller 160 that includes the parity engine 125 that uses buffer memory 120 (e.g., XRAM 120) for temporarily storing parity data.

As used herein, buffer memory 120 may refer to a memory or a portion of memory that is set aside as a temporary holding place for data that is being sent to or received from another component or device. In some embodiments parity buffer memory 120 refers to buffer memory 120 that holds parity data generated by parity operations, such as XOR memory 120 that holds XOR data from XOR operations, or the like. In some embodiments, the parity engine 125 may be implemented using any of the hardware and/or software structures described herein (e.g., processors, logic gates, programmable logic, firmware, software, or the like) with respect to modules and/or engines.

In one embodiment, the memory device 100 may include one or more volatile and/or non-volatile memories 140. For example, in one embodiment non-volatile memories 140 may include NAND flash memory. However, in some embodiments, non-volatile memories 140 may include any type of non-volatile memory for which parity data may be useful. In some embodiments, non-volatile memory 140 may include ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), and/or optical storage media; or other memory and/or storage media. The memories 140, in further embodiments, may include volatile memory 140, such as random access memory (RAM), dynamic RAM (DRAM), static RAM (SRAM), or the like. In some embodiments, a controller 160 may include a processor 145 that accesses memory 150 that may include firmware 155 (sometimes referred to as flash controller firmware or "FW") as well as other data.

In some embodiments, the processor 145 may be a multicore processor that may include one or more datapath cores that process data in the data path from the host computing device 105 to the memories 140. In some embodiments, the functions described as being performed by the processor 145 may alternatively or in combination be performed by other logic devices and/or firmware which may be executed by a state machine, a processor core, or any other device capable of executing specific or general instructions and/or functions. In some embodiments, the processor 145 may access a host interface module "HIM" 110 by which the host computing device 105 may access data on the memory device 100, or the like.

In one embodiment, a write operation may occur generally as depicted in six high-level steps numbered one through six shown in circles in FIG. 1. In one embodiment, at step one, the HIM 110 may receive notification of a command and may fetch it from host space. In some embodiments, if the HIM 110 determines that the command is a write command, it may parse the command and notify the FW 155 (running on the processor 145). In one embodiment, the FW may schedule rights, determine the target physical address and reserve buffers in a transfer RAM ("TRAM") 115. In one embodiment, at step two, the HIM 110 transfers data from a host computing device 105. In one embodiment, the HIM 110 sends a response to the host computing device 105 for cached host transfers.

In some embodiments, the controller 160 may include parity engine 125 that may compute parity data for data that is written to one or more memories 140. In one embodiment, at step three, the FW 155 passes the command to datapath cores in the processor 145 to start processing stored data in the TRAM 115 e.g., by transferring data from the TRAM 115 to the parity engine 125. In some embodiments, the parity engine 125 may accumulate parity data (e.g., XOR data or the like) by successively performing bit wise exclusive or ("XOR") operations on the data that is written to the memory 140 and a location in memory that contains the result of prior XOR operations. In some embodiments, the parity engine 125 may update parity data in parity buffer memory 120 (sometimes known as an XOR RAM 120 or XRAM 120). In other words, parity data previously stored in the XRAM 120 is XORed with the data that is written and the result is stored back to the XRAM 120.

It may be noted that in some embodiments, the parity buffer memory 120 may include memory selected from the group consisting of 6T SRAM, resistive RAM ("ReRam"), DRAM, and/or combinations thereof. In some embodiments, the selection of the type of memory may be determined by evaluating factors such as density, cost, manufacturing process steps, performance, and so forth of the selected memory type for the controller 160 for a given application.

In some embodiments, individual die of memory 140, such as for example, NAND flash, may be implemented as separate die from the other memory in the controller 160. In other embodiments, certain portions of the memory such as parity scratch memory, which may also sometimes be referred to as a temporary (or temp) block (e.g., 607, 707), may be implemented for example in single level cell ("SLC") NAND flash that is on the same die as the memory 140. As used herein the term "scratch memory" refers to a region of memory that temporarily stores data for use in subsequent operations. In some embodiments, the term "parity scratch memory" refers to scratch memory that may be used to store results of parity operations. In some embodiments, the parity scratch memory may be implemented in SLC memory which may be advantageous because SLC memory typically has higher density, than for example SRAM.

In some embodiments, portions or all of the memory 140 may be implemented on the same die as other portions of the controller 160 with the processing logic and/or certain portions of SRAM memory 140 implemented on the lower layers of the die and non-volatile memory 140 e.g., NAND flash, may be implemented on higher layers.

In some embodiments, the parity engine 125 may include a low-density parity check ("LDPC") engine 175 coupled to the parity buffer memory 120. In some embodiments, an LDPC engine 175 may include a scrambler 165 and an encoder 170. In some embodiments, at step 4, data from the TRAM 115 is transferred to a scrambler 165 and an encoder 170 within an LDPC engine 175. In some embodiments, at step five, after data is scrambled and/or encoded, an LDPC engine 175 transfers scrambled/encoded data to a buffer RAM 130 (sometimes referred to as "BRAM" 130). In some embodiments, at step six, the data in the buffer RAM 130 may be read by a flash interface module "FIM" 135 and transferred to a memory 140. It may be noted by one of ordinary skill, that while nomenclature used in describing the controller 160 sometimes indirectly refers to flash memory as in flash interface module FIM 135, a controller 160 may in some embodiments be used for types of memory 140 other than flash memory (e.g., NAND flash) for which parity data may be beneficially used for detecting and/or correcting errors.

In some embodiments, the processor 145 issues commands to read the memories 140 (e.g., NAND flash) in different sized chunks of data (e.g., 16 kB, 32 kB, or the like). In some embodiments, a read request is passed to a Flash Interface Module (FIM) 135. In one embodiment, a command to read data from memories 140 is passed to the FIM 135 which may use a Direct Memory Access (DMA) engine to read a chunk of data of a predetermined size. In one embodiment, the processor 145 issues a command to a DMA engine to read a physical plane page (e.g., 16 kB) of data from the memories 140. In another embodiment, the processor issues a command to a DMA engine to read a die page (e.g., 32 kB) of data from the memories 140.

As described below with regard to FIG. 2, in some embodiments, the parity bins are read in pairs (e.g., 220*a* pairs bins 0,36 and 220*b* pairs 3,39). In some embodiments, host data is handled completely by a DMA engine that may be implemented using logic which may be programmable or fixed gates. For example, in one embodiment, the HIM 110 includes a DMA engine that receives data from a host and transfers receive data to TRAM 115. Similarly, in one embodiment, an LDPC engine 175 includes a DMA engine that transfers data from the TRAM 115 to a small buffer within LDPC 175 for scrambling (e.g., via scrambler 165) and encoding (e.g., via encoder 170) before transferring the data to the BRAM 130.

In some embodiments, different memories within a controller 160, such as for example, TRAM 115, BRAM 130, and/or XRAM 120 may be described as RAM and may be implemented using static RAM, such as for example 6T SRAM or the like. However, it may be noted that in some embodiments, a buffer memory 120 may be a portion of memory that may be set aside as a temporary holding place for data that may be in the process of being sent to or received from another device. Thus, buffer memories such as XRAM 120 may be implemented using any type of memory that can be accessed within predetermined time frames.

For example, in some embodiments, one or more of the TRAM 115, BRAM 130, and/or XRAM 120 may be implemented in any type of volatile or non-volatile memory that meets the timing and functional requirements of a particular application. In other embodiments, the various memories of the controller 160 may be implemented in DRAM, other types of non-6T SRAM, Re-RAM, and the like. Moreover, as used herein, reference to XRAM 120 or parity buffer memory 120 may refer to one or more devices each having one or more blocks or other regions. Further, reference to multiple XRAMs 120 or to parity buffer memories 120 may refer to multiple blocks or regions of memory implemented within one or more physical memory devices.

As described in greater detail below, in some embodiments, the XRAM 120 may include separate regions of memory corresponding to different types of data that may be stored in various blocks of memory 140. Organizing the XRAM 120 to include separate regions of parity buffer memory 120 for different types of blocks with memory 140 may be a useful architecture. However, in some embodiments, a significant improvement in memory device technology may be achieved by accumulating combined parity data for different types of open blocks within memory 140 using a smaller total amount of parity buffer memory (XRAM) 120 in the controller 160. It may be noted that while the example embodiments illustrated and described herein reference particular kinds of memory and/or particular amounts of memory, the embodiments described may apply just as well or better to other kinds of memory and/or other amounts of memory.

In some embodiments, the controller 160, using the parity engine 125 or the like, may be configured to perform a recovery operation for one or more blocks or other regions of memory 140, such as a de-XOR operation or another reverse parity operation. Instead of or in addition to performing a recovery operation for data in response to the LDPC engine 175 or other error correction engine 175 encountering an uncorrectable error in the data, the controller 160 may be configured to proactively perform the recovery operation in response to determining that a latency setting for the data satisfying a latency threshold, or the like. For example, the controller 160 may be configured to service a read request for data based on a previously performed recovery operation for the data, in order to satisfy a latency setting for the data (e.g., without reading the data from the memory 140 after the read request is received, without performing error correction for the data using the LDPC engine 175, or the like).

In certain embodiments, a latency setting comprises an indicator and/or attribute of a desired, preferred, maximum, and/or other target latency at which the controller 160 executes read operations from one or more blocks or other regions of memory 140. For example, a host computing device 105, a user of a host computing device 105, or the like may set a latency setting, a latency setting may be predefined (e.g., a default latency setting), or the like. In one embodiment, a latency setting comprises a read recovery level ("RRL") setting or other configurable attribute that balances a latency or completion time for a read command and the amount of error recovery applied to the read command. In a further embodiment, a latency setting comprises an extended error recovery setting that is disabled (e.g., indicating that a host computing device 105 and/or a user of a host computing device 105 does not require the associated data and/or region of memory 140 to undergo extended error recovery by the parity engine 125, or the like, which may take longer than error correction by the LDPC engine 175 therefore increasing latency).

In various embodiments, a lower read recovery level setting may indicate a lower latency and a lower amount of error recovery, a higher read recovery level setting may indicate a higher latency and a higher amount of error recovery, vice versa, or the like. In one embodiment, a read recovery level setting may comprise multiple possible levels (e.g., two levels, three levels, four levels, sixteen levels, thirty-two levels, sixty-four levels, one hundred and twenty-eight levels, or the like). Higher numeric setting levels for a read recovery level setting, in some embodiments, provide less recovery than preceding lower levels for the read recovery level setting, such as in the Non-Volatile Memory Express (NVMe) Specification, or the like. A highest read recovery level setting, in certain embodiments, may comprise a fast fail level providing a minimum level of error recovery, a minimum latency, or the like (e.g., for sixteen supported levels zero through fifteen, level fifteen may comprise a fast fail level, level zero may provide a maximum amount of error recovery, level four or another level between zero and fifteen may comprise a default level, such as in the NVMe Specification, or the like).

In certain embodiments, a host computing device 105, a user of a host computing device 105, a controller 160, or the like may set different latency settings (e.g., read recovery levels or the like) for different data, for different blocks or other regions of memory 140 (e.g., memory cells, pages, physical pages, logical pages, word lines, blocks, physical blocks, logical blocks, dies, die planes, divisions, sectors, groups, and/or other regions), or the like. For example, different latency settings may be selected based on a type of data (e.g., video data, audio data, video game data, text data, image data, recently accessed/used data, least recently accessed/used data, frequently accessed/used data, least frequently accessed/used data, or the like).

In one embodiment, the controller 160 is configured to automatically determine a latency setting for data, for a region of memory 140 storing the data, or the like based on a type of the data stored by the region of memory 140 (e.g., by scanning the data stored by the region of memory 140, scanning metadata for the data stored by the region of memory 140, or the like). In a further embodiment, the controller 160 is configured to receive a latency setting for data, for a region of memory 140 storing the data, or the like from the host computing device 105 (e.g., over a communication bus, as part of or in association with a write request for the data, as a field in a data structure, or the like).

The controller 160, in some embodiments, may determine whether a latency setting for data (e.g., for a region of memory 140, or the like) satisfies a latency threshold (e.g., equals a latency threshold, is greater than a latency threshold, is greater than or equal to a latency threshold, is less than a latency threshold, is less than or equal to a latency threshold, and/or has another predefined relationship relative to a latency threshold). For example, in one embodiment, a latency threshold may be defined such that one or more latency settings (e.g., read recovery levels or the like) above a default level may satisfy the latency threshold. In a further embodiment, a latency threshold may be defined such that maximum level (e.g., a fast fail level or the like) satisfies the latency threshold. A controller 160 may store latency settings as metadata with the data and/or regions of memory 140 associated with the latency settings in the memory 140, may store latency settings in a separate metadata structure in the memory 150, and/or may otherwise store or track latency settings.

The controller 160, in response to determining that a latency setting for data, for a region of memory 140 storing the data, or the like satisfies a latency threshold, may perform a recovery operation for the data and/or the region (e.g., performing a reverse parity operation such as a de-XOR operation to recover data of a region, even if the controller 160 has not yet received a read request for the data and/or the region, prior to the controller 160 receiving a read request for the data and/or the region, or the like). In some embodiments, the controller 160 may temporarily buffer, cache, and/or store data recovered using a recovery operation (e.g., in the memory 150, in the memory 140, in the TRAM 115, in the BRAM 130, or the like) until receiving a read request for the data from the host computing device 105 and may use the recovered data to service the read request. In a further embodiment, the controller 160 may write the recovered data back to the memory 140 (e.g., thereby correcting one or more data errors in the previously stored copy of the data previously stored by the memory 140) and may subsequently read the recovered data back from the memory 140 to service the read request.

The controller 160, in another embodiment, may remove invalid data of at least a region of memory 140 from combined parity data (e.g., so that a subsequent recovery operation executes more quickly without parity data for the invalid data, to satisfy a latency setting or the like), determining new parity data for remaining valid data and satisfying the read request using the new parity data (e.g., performing a recovery operation using the new parity data so that the recovery operation completes fast enough to satisfy a latency setting, or the like). For example, the controller 160 may maintain a validity map or other metadata structure indicating which data of a region of memory 140 is valid and/or which is invalid (e.g., has been deleted or trimmed, has been overwritten or replaced by new data of a subsequent write request for the same addresses, and/or has otherwise been invalidated), and may remove parity data for invalid data from the combined parity data based on the validity map or other metadata structure (e.g., even if the memory 140 still stores the invalid data, or the like).

In embodiments where different blocks or other regions of memory 140 have different latency settings, the controller 160 may be configured to perform recovery operations (e.g., proactively before receiving a corresponding read request) for different regions of memory 140 at different frequencies based on the different latency settings. For example, the controller 160 may perform recovery operations more frequently for regions of the memory 140 with latency settings indicating a lower latency, less error recovery, or the like; may perform recovery operations less frequently for regions of memory 140 with latency setting indicating a higher latency, more error recovery, or the like; and/or may otherwise perform recovery operations at different frequencies for different regions of memory 140 with different latency settings.

In some embodiments, the controller 160 may select a region of memory 140 for which to perform a recovery operation based on a history of data access (e.g., anticipating a subsequent read request for data based on a previous pattern of read requests, or the like). For example, as a video file is read from the memory device 100 for playback, or the like, the controller 160 may proactively perform a recovery operation for video data later in the file (e.g., associated with subsequent memory addresses, or the like) anticipating the subsequent read requests for the data based on the earlier read requests for data from the video file. In a further embodiment, the controller 160 may select a region of memory 140 for which to perform a recovery operation based on a frequency the region is accessed, based on how recently the region has been accessed, or the like (e.g., performing recovery operations more frequently for regions that are more often accessed, more recently accessed, or the like).

Figure 2:
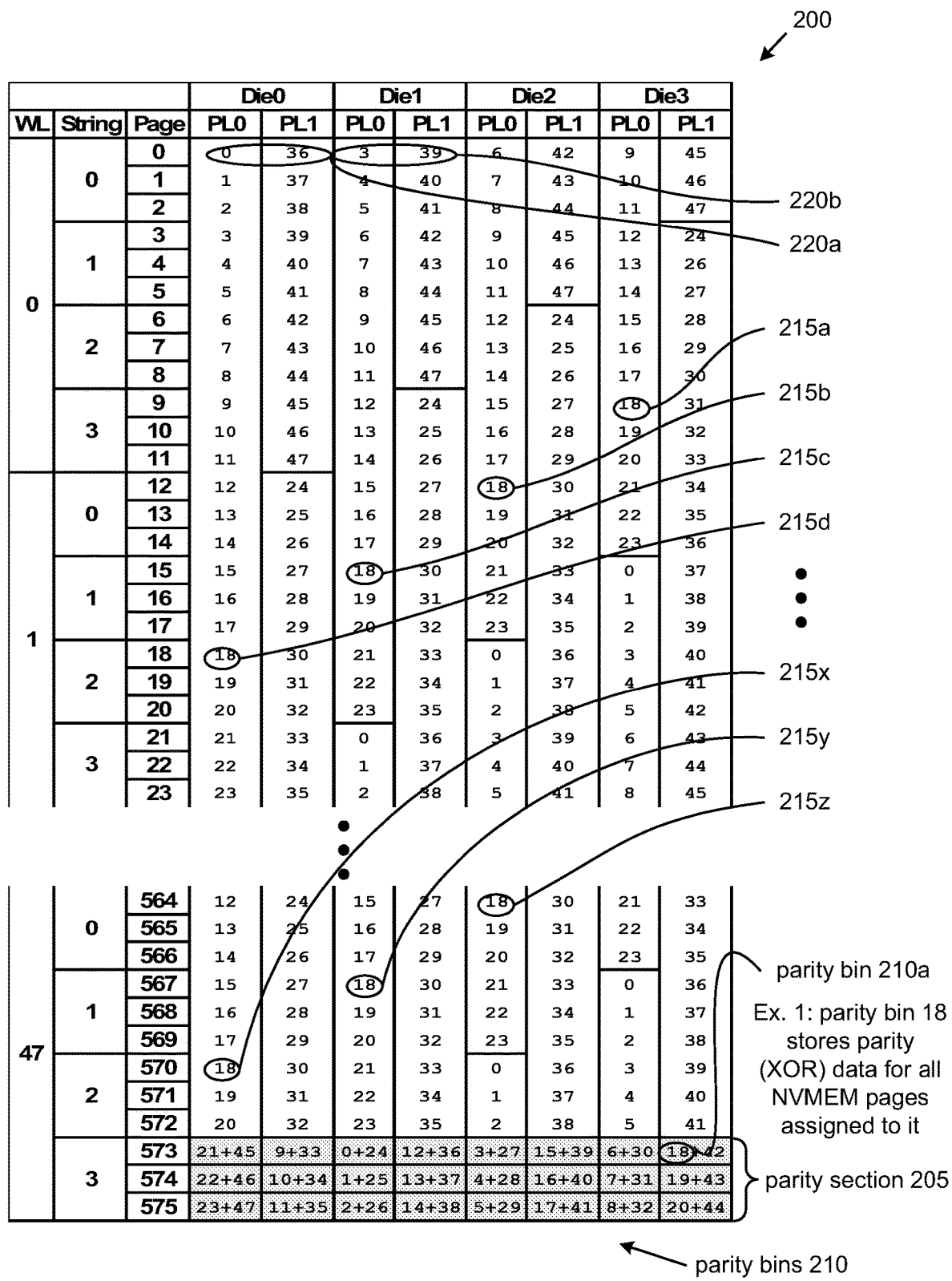
FIG. 2 is a schematic block diagram illustrating one embodiment of a region of memory.

FIG. 2 is a schematic block diagram illustrating one embodiment of a block of memory 140 having a parity region 205 that can be written in response to the controller 160 determining to close the block, or the like. In one embodiment, the parity region 205 may be organized into parity bins 210 (also referred to as XOR bins) for use in error detection and/or correction of the memory 140 by the controller 160.

In one example embodiment, the table 200 refers to multiple die or other regions of memory 140 (e.g., Die0, Die1, Die2, Die3, as shown on the top row of table 200). It may be noted that the term "die" as used herein may be both singular and plural (e.g., one die, two die, three die, and so forth). Other plural forms of the word "die" sometime include "dice" and/or "dies". In one embodiment, each die may be organized as two planes PL0 and PL1. In another embodiment, each die may be organized as four planes (e.g., PL0, PL1, PL2, PL3). The apparatuses and methods disclosed herein may be used in various memory devices with different organizations between the number of planes and the number of die. The memory 140 may be accessed in pages of, for example, 16 kB. Each entry in the table 200 may be assigned such that parity information for the assigned location may be accumulated to a particular XOR parity bin (e.g., a binary number). One parity bin 210 may include 16 kB worth of parity data for the assigned memory locations, or the like.

In the depicted embodiment, a parity bin 210 may be a bitwise XOR of a set of member pages. So, for example, a parity bin P1=pgA$\wedge$pgB$\wedge$pgC where "pg" stands for page and "A" represents a bitwise XOR operation. Because an XOR operation is its own inverse, the binary value of one page (e.g., pgA) may be recovered by reversing the XOR process, which means, as used herein, XORing the parity bin with all the other member pages (e.g., pgA=P1$\wedge$pgB$\wedge$pgC). As used herein, the term "reverse XOR operation" refers to the fact that parity data accumulated for a particular memory location may be removed by performing an additional XOR operation with the accumulated parity data and data in the particular memory location.

As used herein, the term "scan" or "scanning" an open block refers to performing successive parity operations on written portions of the open block to accumulate parity data for the open block or in the case of reverse parity operations to remove parity data for the open block from the accumulated parity data. In some embodiments, parity data may be generated through use of an exclusive OR operation also referred to as an XOR operation. In other embodiments, other operations or combinations of operations may be used to generate parity data. As used herein, the term "accumulate parity data" refers generally to successively performing a bitwise XOR operation or other parity operation between a previous XOR operation result or other parity operation result and a next memory location.

In some embodiments, the first XOR operation may be, for example, between a result location that may be initialized to binary zero which may be then XORed with the first memory location which results in the contents of the first memory location being accumulated to the XOR result since zero XOR did with any binary number results in the binary number. Then that XOR result may be XORed with the next memory location to be scanned.

Thus, by successively performing bitwise XOR operations between the result memory location and annexed memory location to be scanned, parity data may be accumulated. In some embodiments, an open block of memory 140 (e.g., NAND flash, or the like) may be scanned in order to store parity data for the written portions of the open block of memory 140 so that the parity data may be written to the open block and the block may be closed.

Thus, as described below with respect to FIG. 3, in some embodiments, multiple open blocks of memory 140 may be scanned to accumulate non-combined parity data for each block of the multiple open blocks. As used herein the term "non-combined parity data" refers to accumulated parity data particular to one block of memory 140. As described below with respect to FIGS. 4-9, in some embodiments, two or more open blocks may be scanned to accumulate combined parity data where the term "combined" refers to the fact that parity data from one of the open blocks may be XORed with parity data from another of the open blocks such that the resulting parity data may be considered combined parity data for multiple blocks, or other regions of memory 140.

As described below with respect to FIG. 5, one or more open blocks of data may be rescanned to remove parity data for the one or more open blocks from the combined parity data. As used herein combined parity data refers to accumulated parity data from at least two different blocks or other regions of memory 140. In some embodiments, the combined parity data may be accumulated by XOR in a previous parity result with data from two, three, or any number of open blocks of memory 140. The concept of combined parity data is illustrated and described in more detail below with respect to FIGS. 4-5 in particular.

In some embodiments, parity data for write data to be written to each page of the memory 140 may be computed and assigned to one parity bin 210 for detecting word line to word line errors and to a different parity bin for detecting plane to plane errors.

In one embodiment as depicted in the table 200, multiple pages of memory (e.g., 215a, 215b, . . . 215x, 215y, 215z) may be assigned to a specific parity bin 210, such as for example, parity bin 18 210a. In some embodiments, this means that the same bin memory in the XRAM 120 to compute parity data for one bin may be reused to further compute parity data for a second bin.

It may be noted that the numbering of the assigned parity bins in the table 200 may be staggered in a checkerboardlike pattern so that no repeating parity bin numbers are adjacent to each other on planes PL0 and PL1. This may allow use of the parity to detect plane-to-plane shorts. Similarly, in the depicted embodiment, there are no repeating parity bins on paired local word lines ("LWL") which may allow the use of parity to detect wordline-to-wordline errors such as shorts. In some embodiments, a general rule may be that whenever there is a failure in the memory 140, pages which have unique bin numbers may be recovered. Thus, the staggered pattern may optimize detection of multiple types of memory failures.

In some embodiments, the parity engine 125 accumulates parity data for the parity bins each time one of the open blocks of memory 140 is written to. In some embodiments, the data may be not directly accumulated to the parity region 205 of the memory. Rather it may be written to the parity bins for one or more parity buffer memories (e.g., within XRAM 120) until the controller 160 determines to close one block of the multiple open blocks at which time the parity engine 125 programs into the memory blocks and indicates that the status=pass, or the like.

Thus, as described below with respect to FIGS. 3 through 9, in the example illustrated, there are 48 bins each with 16 K worth of parity data for each open block of data to be written to the memory 140 which equals, in this example, 768 kB of parity bin data per open block. It may be noted by one of skill in the art that the exemplary sizes of memory, mapping of pages to particular parity bins, and other details regarding the organization and structure of the parity buffer memory XRAM 120 may be varied without departing from the embodiments of the apparatuses and methods disclosed herein.

Figure 3:
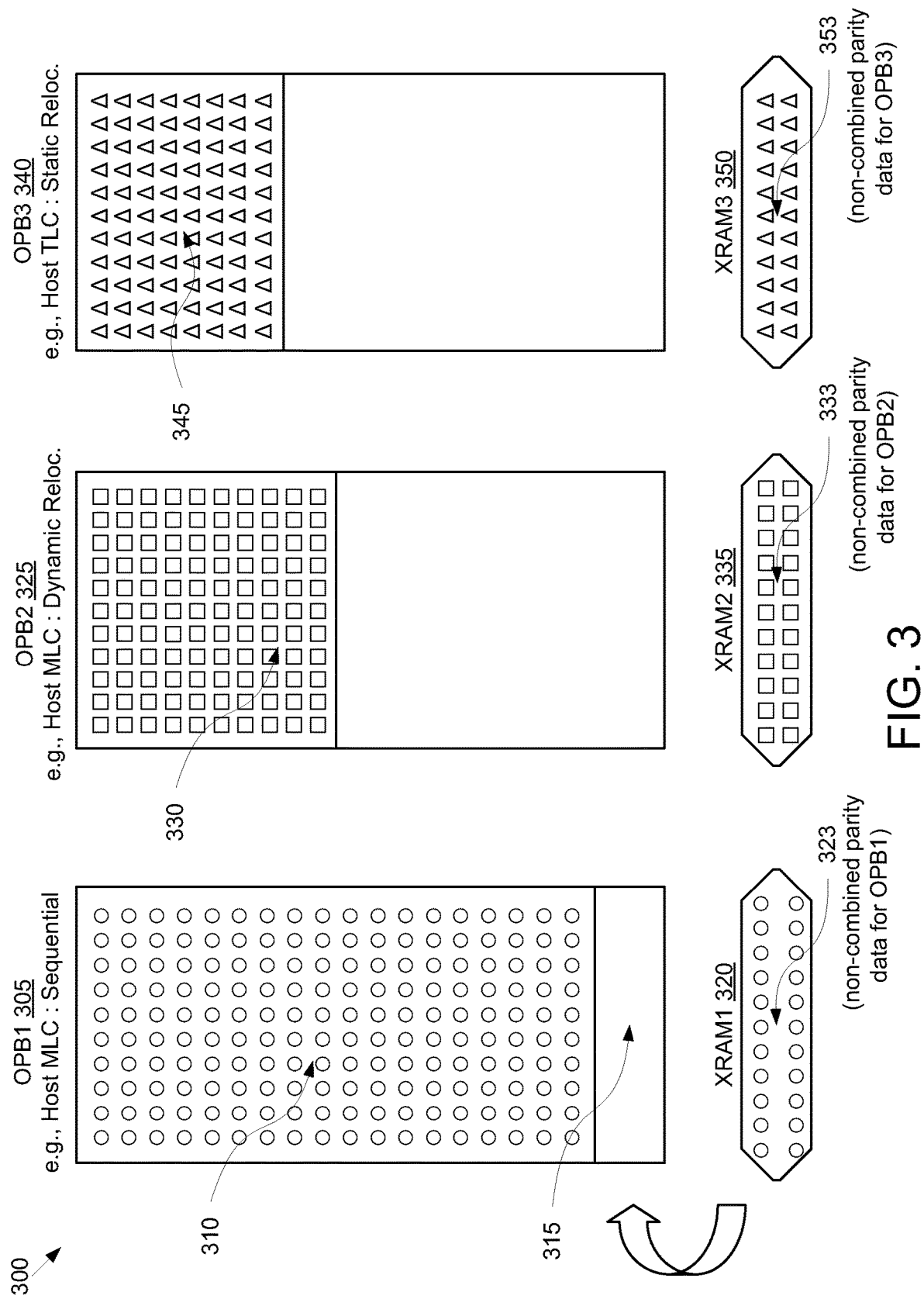
FIG. 3 is a schematic block diagram illustrating one embodiment of multiple parity buffer memories for multiple regions of memory.

FIG. 3 is a schematic block diagram 300 illustrating multiple parity buffer memories (e.g., XRAM1 330, XRAM2 335, and XRAM3 350) for multiple open blocks of memory 140 (e.g., OPB1 305, OPB2 325, and OPB3 340). Each of the parity buffer memories (e.g., 330, 335, and 350) accumulates non-combined parity data (e.g., 323, 335, 350) to be written to corresponding parity regions (e.g., 315) of open blocks 305, 325, 340 of memory 140. As used herein, the term "non-combined parity data" refers to parity data that has been computed and/or accumulated for a particular block or region of memory 140.

It may be noted that the parity region 315 for the open block OPB1 305 is labeled to show that the parity region may be written in response the controller 160 determining to close open block OPB1 305, for example, in response to the other locations within the open block OPB1 305 being fully written. As used herein, the term "fully written" refers to at least a predetermined portion of the block being written. In some embodiments, "fully written" means that an entire block except for a parity region has been written. In other embodiments, a block may be considered to be fully written if a predetermined number of locations have been written even if certain locations besides the parity region have not yet been written. In some embodiments, the remaining open blocks, such as OPB2 325 and OPB3 340, also include their own parity regions similar to parity region 315.

In some embodiments for a particular type of memory 140, such as for example NAND flash, the controller 160 may maintain a set of open blocks at any given instant to handle different types of writes to the NAND flash blocks. In some embodiments, the memory device 100 may include multiple triple level cell ("TLC") open blocks to handle different types of host traffic such as host sequential reads/writes or host random read/writes. An example of one open block of this type is depicted as OPB1 305. It may be noted that sometimes TLC may be referred to as 3-bit MLC. Because MLC refers to multilevel cells, sometime the term MLC may refer to flash memory that has two or three or potentially even more levels as such technologies are developed.

Another type of open block may be used for internal relocation of data from single level cell ("SLC") flash to TLC in order to free up SLC blocks, also referred to as dynamic relocation. In the depicted embodiment, the open block OPB2 325 represents one example of this type of dynamic relocation open block. In some embodiments, another type of open block may be used for relocation to handle wear-leveling within the memory 140, also sometimes referred to as static relocation. The open block OPB3 340 as depicted represents this type of static relocation open block. In some embodiments, as data is written to each open block (e.g., OPB1 305, OPB2 325, OPB3 340) parity data is accumulated and written to the XRAM 120.

In the example illustrated in FIG. 3, the XRAM 120 may include three separate regions of parity buffer memory 120 (e.g., XRAM1 320, XRAM2 335, and XRAM3 350). While only three types of open blocks are depicted in FIG. 3, in some embodiments, other types of open blocks may be used, for example to handle relocation for errors grown within the memory 140, also called blind relocation. Similarly, in some embodiments, there may be multiple open blocks for SLC to handle host random data, control data, blind relocation, and so forth. The controller 160 may proactively perform recovery operations (e.g., de-XOR, reverse XOR, or the like) as described herein for open blocks, closed blocks, and/or both open and closed blocks.

In one embodiment, the parity bins for OPB1 305 (e.g., the XRAM1 320) may contain non-combined parity data 323, which means, as used in this example, parity data specific to open block OPB1 305. In other words, the parity engine 125 may scan OPB1 305 to accumulated non-combined parity data 323 for OPB1 305. Similarly, XRAM2 335 accumulates non-combined parity data for OPB2 325 and XRAM3 350 accumulates non-combined parity data for open block OPB3 340. Using the example sizes of parity buffer memory 120 previously described above with respect to FIG. 3, each of the open blocks OPB1 305, OPB2 325, OPB3 340 has 768 kB worth of parity data for a total of 3×768 kB=2304 kB.

The open block OPB1 305 is depicted in FIG. 3 as fully written with data 310 (depicted with circle symbols) except for a parity region 315, so that upon writing of the non-combined parity data 323 for OPB1 305 (also depicted with circle symbols to show that it corresponds to write data 310) to the parity region 315 of OPB1 305 the block may be closed. In some embodiments, the parity region 315 of an open block may be located in a last meta-word line of the open block.

FIG. 3 depicts a block that the parity engine 125 determines to close (e.g., OPB1 305) and the remaining open blocks (e.g., OPB2 325 and OPB2 340). One of the remaining open blocks OPB2 325 may be partially written with data 330 (depicted with square symbols) and thus, may not be ready to be closed until it is fully written, except for a parity region (not shown, but similar to parity region 315).

As used herein, the term "remaining open blocks" may refer to any open blocks besides the one block the parity engine 125 has determined to close. Moreover, in some embodiments, as a controller 160 designates additional open blocks of memory 140, the number of remaining open blocks may increase, decrease, or remain the same, because some open blocks may be closed and other blocks may be opened and the total number of remaining open blocks may vary over time.

Even though the open block OPB2 325 may be only partially written with data 330, non-combined parity data 333 may be accumulated in the XRAM2 335 with each write to the open block OPB2 325 so that when the open block OPB2 325 is full, the parity bins (XOR2 bins 335) may be written to the parity region of the open block OPB2 325 so that open block OPB2 325 may then be closed.

Likewise, another remaining open block OPB3 340 may be partially written with data 345 and corresponding parity bins (e.g., XRAM3 350) accumulate non-combined parity data 353 with each write to the open block OPB3 340, so that when OPB3 340 is fully written except for a parity region, parity data in XRAM3 350 may be written to the parity region (not shown, but similar to parity region 315) of the OPB3 340.

In some embodiments, at a certain point in time, one block of any number of multiple open blocks may become fully written except for a parity region. At the same time, the remaining open blocks may be only partially written. In FIG. 3, OPB1 305 is depicted as one block that the parity engine 125 may determine to close and the parity engine 125 may determine to close remaining open blocks later (e.g., OPB2 325 and OPB 340).

In some embodiments, once non-combined parity data 323 in the XRAM1 320 for the one block (e.g., OPB1 305) has been written to the parity region 315, the one block may be closed. In some embodiments, the next block to become fully written except for the parity region may be considered to be the one block the parity engine 125 determines to close while the parity engine 125 generates non-combined parity data in response to writes to any remaining open blocks (e.g., OPB2 325 and OPB3 340).

Using the example sizes of memory 140 described above, it may be noted that in some embodiments, a significant amount of XRAM 120 may be required (e.g., 768 kB per open block times three (3) open blocks=2034). In some embodiments, there may be more open blocks (e.g., OPB4, OPB5, and so forth) for other types of data (e.g., blind relocation within TLC/MLC, or within various types of SLC open blocks, or the like).

Figure 4:
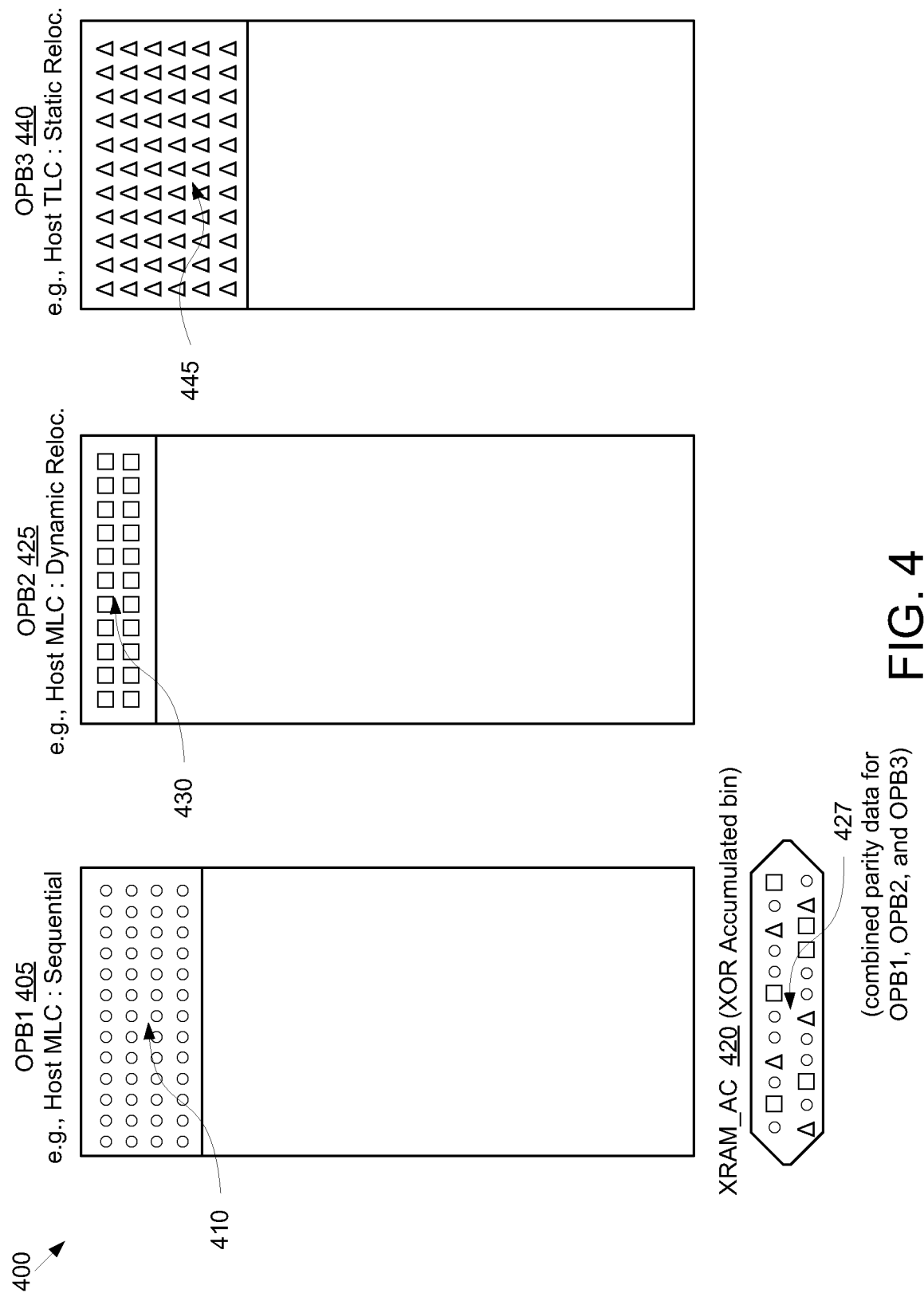
FIG. 4 is a schematic block diagram illustrating one embodiment of a parity buffer memory that accumulates combined parity data for multiple regions of memory.

FIG. 4 is a schematic block diagram illustrating parity buffer memory 120 (e.g., XRAM_AC 420) that accumulates combined parity data 427 for multiple open blocks of memory 140 (e.g., OPB1 405, OPB2 425, OPB3 440). As previously stated, in some embodiments, the term "combined parity data" refers to the fact that parity data calculated for a portion of one block of memory 140, using for example exclusive OR (e.g., XOR) operations, may have additional XOR operations performed on the resulting parity data with data from a different block of memory 140. Thus, parity data from one open block of memory 140 may be combined with parity data from another block of memory 140 to result in combined parity data. In some embodiments, a dedicated buffer may be allocated in XRAM_AC 420 for scanning the open blocks. For example, in one embodiment, the dedicated buffer may be 16 kB (e.g., the size of a plane page). In another embodiment, the dedicated buffer may be 32 kB (e.g., the size of a die page).

In an embodiment depicted in FIG. 4, as data 410, 430, 445 is written to each of the different open blocks (e.g., OPB1 405, OPB2 425, and OPB3 440), the parity engine 125 accumulates combined parity data 427 from each of the different open blocks to a common parity buffer memory 120 (e.g., XOR_AC 420). Because data in any one parity bin within XOR_AC 420 includes data 410, 430, 445 written to the three different types of open blocks (e.g., OPB1 505, OPB2 525, and OPB3 540), the combined parity data is depicted with a combination of circle, square, and triangle symbols.

Figure 5:
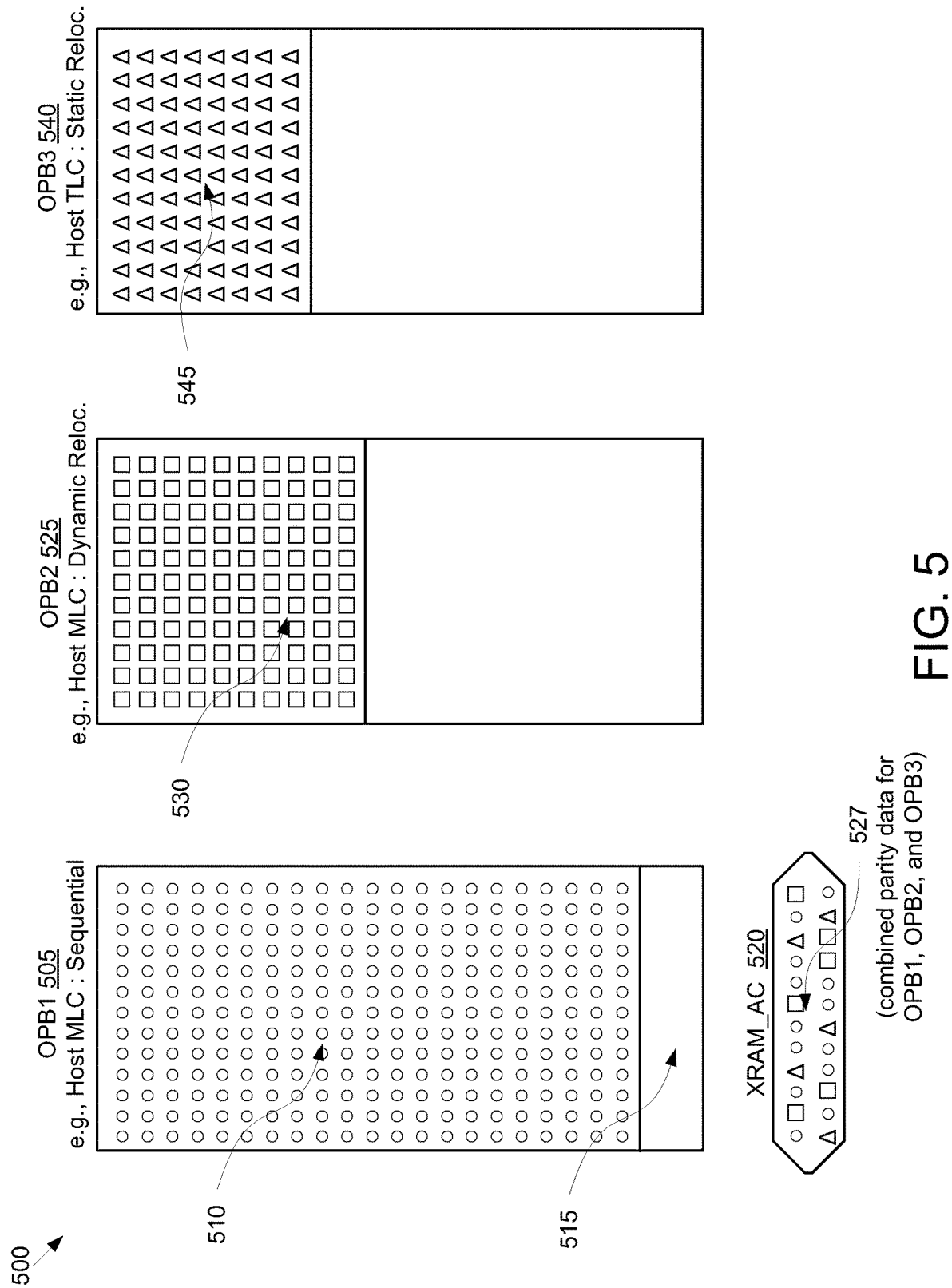
FIG. 5 is a schematic block diagram illustrating a further embodiment of a parity buffer memory with combined parity data for multiple regions of memory.

FIG. 5 is a schematic block diagram 500 illustrating parity buffer memory XRAM_AC 520 that accumulates combined parity data 527 for multiple open blocks of memory 140 (e.g., OPB1 505, OPB2 525, and OPB3 540) for which the controller 160 determines to close one block (e.g., OPB1 505) which has been fully written except for a parity region 515.

FIG. 5 depicts generating combined parity data for multiple open blocks (e.g., OPB1 505, OPB2 525, and OPB3 540) of memory 140 using one parity buffer memory 520. One open block OPB1 505 is depicted as being fully written (e.g., with written data 510 depicted as squares). Two remaining open blocks OPB2 525 and OPB2 540 are depicted as partially written (e.g., with written data 530 and 545 respectively).

In some embodiments, generating combined parity data 527 for multiple open blocks may be accomplished using a memory device 100 that may include a controller 160 for memory 140. The controller 160 may include parity engine 125 that accumulates combined parity data 527 in a parity buffer memory 120 (e.g., XRAM 120 designated for storing combined parity data such as XOR_AC 420, 520, and 620 depicted in FIGS. 4, 5, and 6, or the like) in response to write operations to one block of multiple open blocks of memory 140 (e.g., OPB1 405, 505, 905) and to the remaining open blocks (e.g., OPB2 525 and OPB3 540) of memory 140.

In some embodiments, the controller 160 may generate and/or extract non-combined parity data (depicted below as 643 in FIG. 6) for the one block (e.g., OPB1 505) of memory 140 that the controller 160 determines to close, for which the controller 160 determines to perform a recovery operation (e.g., proactively, prior to receiving a read request), or the like. For example, in response to determining that the one block (e.g., OPB1 505) of memory 140 is fully written (e.g., with written data 510) except for a parity region 515, the controller 160 may close the one block (e.g., OPB1 505) of memory 140 by programming the non-combined parity data to the parity region 515 of the one block (e.g., open block OPB1 505) of memory 140.

Figure 6:
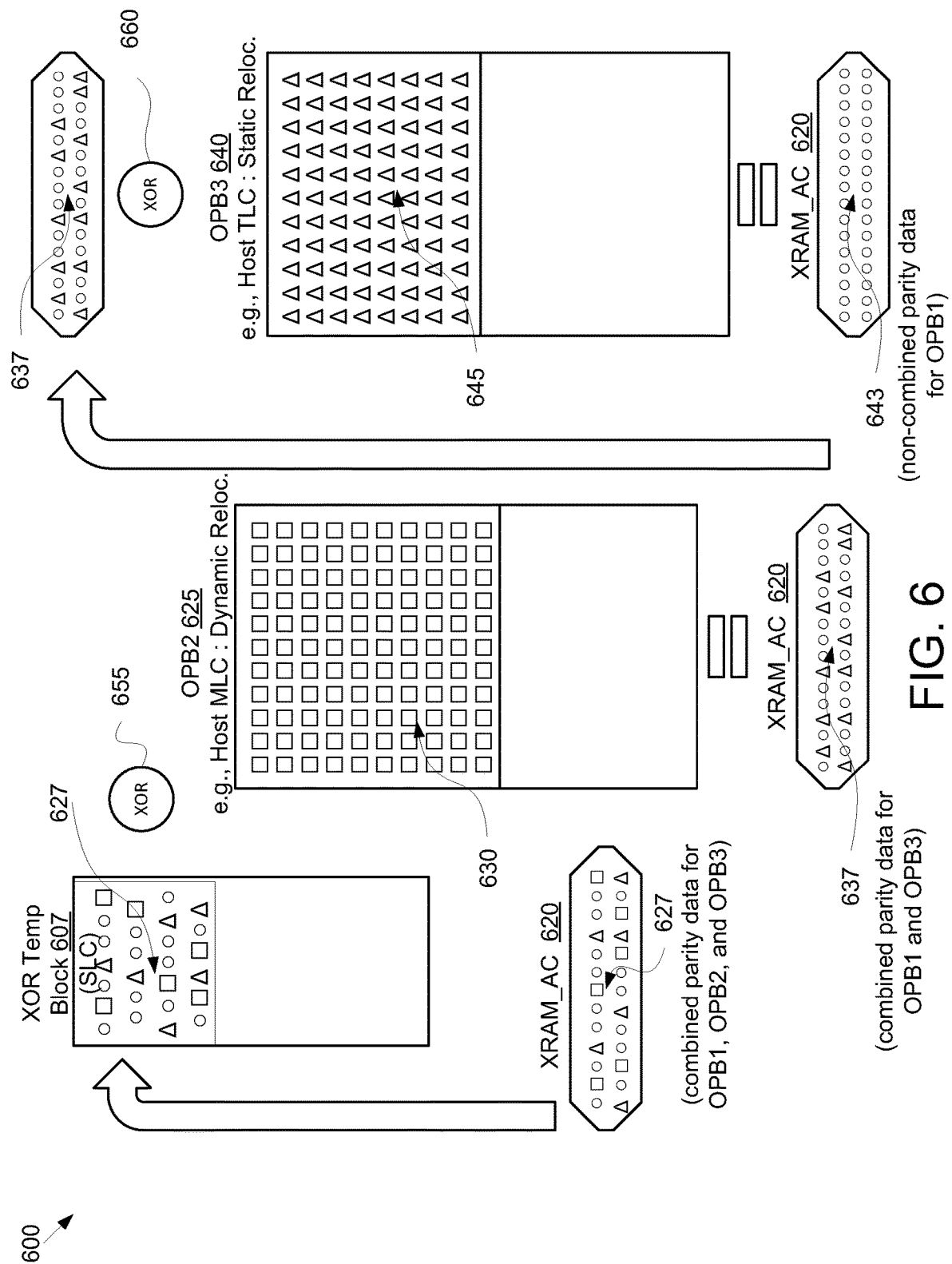
FIG. 6 is a schematic block diagram illustrating one embodiment of a reverse parity operation on combined parity data.

FIG. 6 is a schematic block diagram illustrating one embodiment of the apparatus 600 (which may be substantially similar to the apparatus 400 of FIG. 4) that generates a block of non-combined parity data 643 for writing to the parity region of the one block (e.g., OPB1) by performing reverse XOR operations 655, 660 on the combined parity data 627 and data from the remaining open blocks (e.g., OPB2 625 and OPB3 640).

In one embodiment, the controller 160 may accumulate combined XOR data for the one block the controller 160 determines to close (e.g., OPB1 505). In some embodiments, the controller 160 may store a copy of the combined parity data 627 to a temporary memory location e.g., XOR temp block 607. In some embodiments, the XOR temp block 607 may be implemented in SLC NAND flash. As used herein, the term XOR may sometimes be used as a verb meaning to perform XOR operations. In some embodiments, the combined parity data 627 may then be XORed with corresponding data 630 in one of the remaining open blocks OPB2 625. This produces combined parity data 637 for OPB1 505 and OPB3 640 but the XOR operation 655 with the data 630 for OPB2 625 reverses the effect of prior XOR operations performed on the data 630 (a reverse XOR operation may also be referred to as de-XOR or de-Exor) because an XOR function is its own inverse, as explained above with respect to FIG. 2.

In some embodiments, the combined parity data 637 for OPB1 and OPB3 may be then XORed 660 with the data 645 written to another of the remaining open block OPB3 640. This reverses the XOR operations previously performed on the combined parity data 637 with the written data 645 in OPB3 640 to produce non-combined parity data 643 for the one block the parity engine determines to close (e.g., OPB1 505).

In one embodiment, the controller 160 then closes the one block OPB1 505 of memory 140 by programming the non-combined parity data 643 to the parity region (e.g., 515) of the one block OPB1 505 of memory 140. For purposes of this disclosure, whichever of the one or more open blocks OPB2 625 and OPB3 640 fills up next may be referred to as the one block the parity engine 125 has determined to close and any other open blocks may be referred to as the remaining open blocks. In some embodiments, the parity engine 125 may continue to accumulate combined parity data (also referred to sometimes as combined XOR data) for the open blocks and to generate non-combined data for the new one open block it determines to close when it becomes fully written except for a parity region, or the like.

Figure 7:
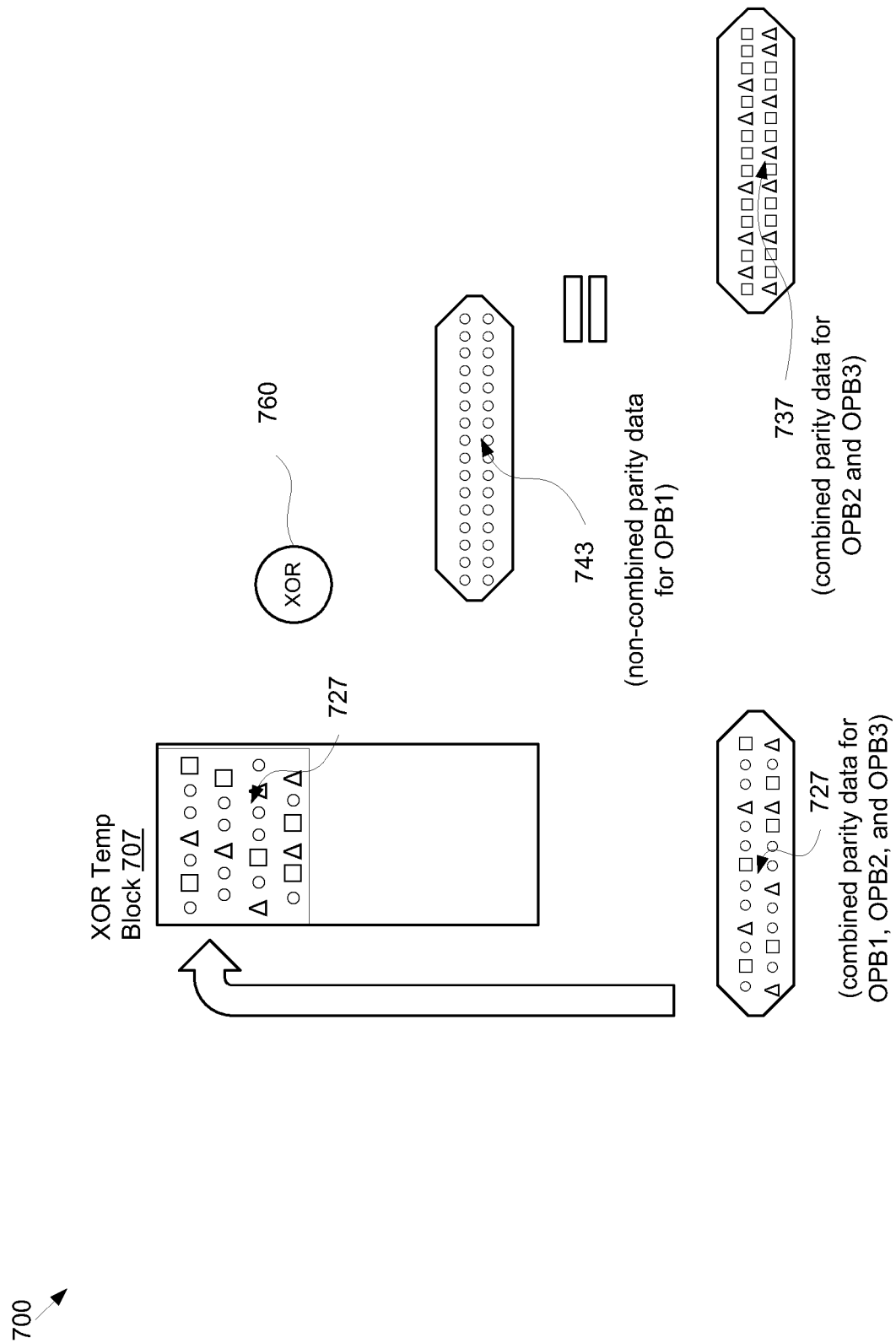
FIG. 7 is a schematic block diagram illustrating one embodiment of removing parity data for a region of memory.

FIG. 7 is a schematic block diagram illustrating one embodiment of an apparatus 700 (which may be substantially similar to the apparatus 400 of FIG. 4, or the like) that generates combined parity data 737 for further accumulation of combined parity data for still open blocks (e.g., OPB2 625, OPB3 640) of memory 140. In the embodiment depicted in FIG. 7, one block that the parity engine 125 determined to close (e.g., OPB1 505) has been closed and parity data for that one block OPB1 now needs to be removed from the combined parity data 727 for OPB1 505, OPB2 625, and OPB3 640 which was previously stored to XOR scratch (temp) block 707. The combined parity data 727 for OPB1 505, OPB2 625, and OPB3 640 stored in XOR block 707 is XORed 760 with the non-combined parity data 743 for OPB1 505. This reverse XOR operation 760 thereby removes and/or extracts the non-combined parity data 743 for OPB1 505 from the combined parity data 727 resulting in combined parity data 737 OPB2 625 and OPB3 640.

If one or more additional open blocks beyond OPB2 625 and OPB3 640 are still open then the combined parity data 737 for OPB2 625 and OPB3 640 may be further combined with parity data accumulated from the remaining open blocks. Whichever of the remaining open blocks becomes fully written next (except for a parity region) may be referred to as the "one block" which may mean that the one block that the parity engine 125 has determined to close and any other blocks that are still open or are newly designated as open blocks are referred to as remaining open blocks and the process may repeat substantially as described above.

Figure 8:
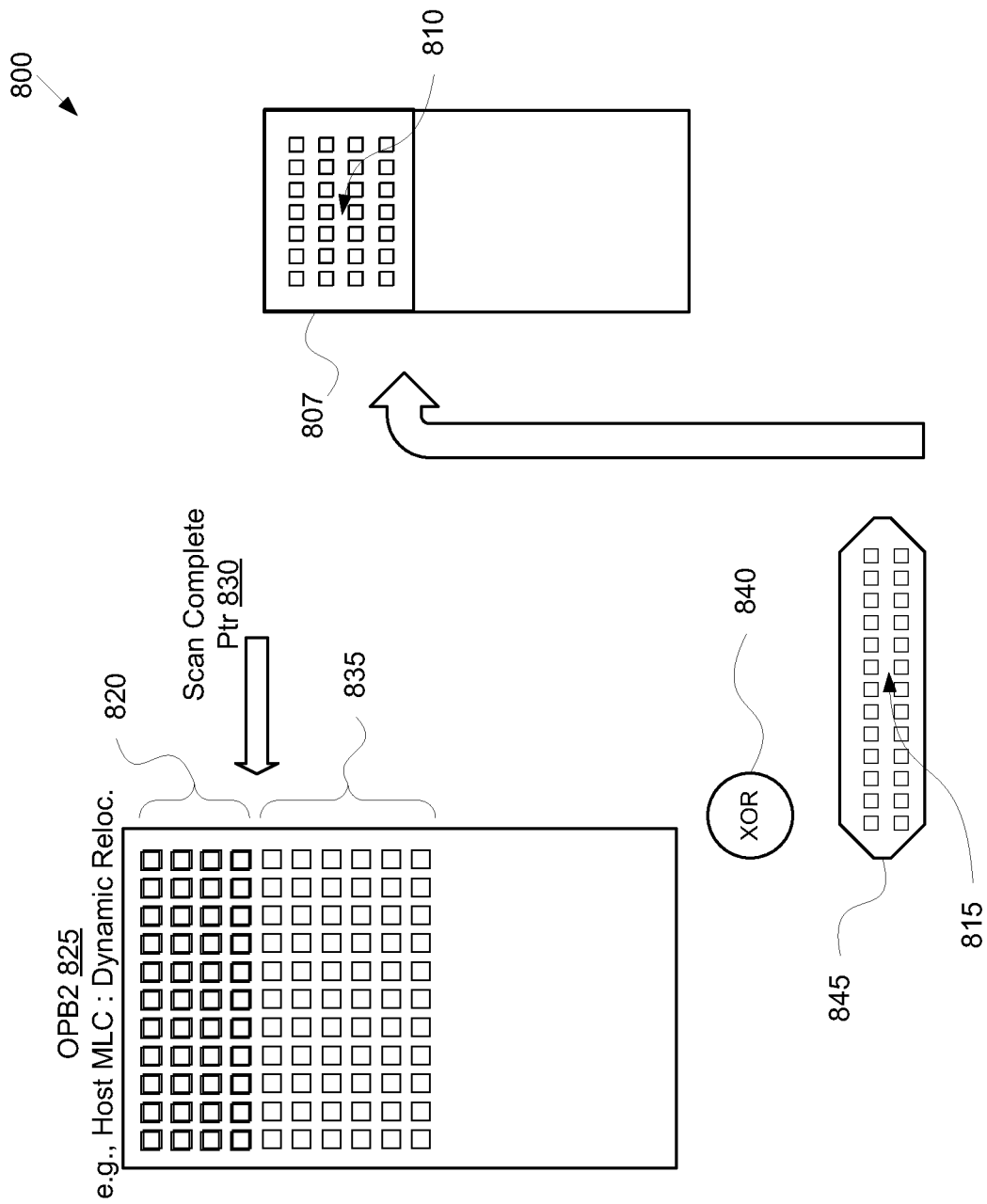
FIG. 8 is a schematic block diagram illustrating one embodiment of accumulating a portion of combined parity data using background operations.

FIG. 8 is a schematic block diagram 800 illustrating accumulating a portion of parity data 815 using background operations. In some embodiments, the process of accumulating parity data for open blocks of memory 140 may be referred to herein as "scanning" the open blocks (e.g., OPB2 625, OPB3 640). Similarly, the process of performing reverse parity operations on open blocks of memory 140 may also be referred to as scanning, or if, for example, the blocks have been previously scanned, may be referred to as rescanning the open blocks.

As described above, the parity engine 125 may scan the open block to generate the combined parity data for the one block and the remaining open blocks, to proactively perform a recovery operation, or the like. The combined parity data may be stored to a temporary parity block so that it can be used again as the parity engine 125 rescans the remaining open blocks to reverse the parity operations from the remaining open blocks, to perform recovery operations, or the like.

In one embodiment, the scanning and/or rescanning of the remaining open blocks, the proactive performance of recovery operations, or the like may be scheduled as background operations in order to offset any potential performance impact. In one embodiment, the parity buffer memory 845 may be configured to accumulate a predetermined portion of parity data for at least one of the one block and the remaining open blocks. In one embodiment, the parity engine 125 may scan a plurality of open blocks to accumulate combined parity data to the parity buffer memory 845 as background operations to the write operations wherein a status of the scanning is indicated by scan complete pointers for each of the plurality of open blocks.

In some embodiments, the controller 160 may include a scheduler that detects write operations to memory 140 and schedules write operations as foreground operations and schedules the operations of accumulating combined parity data in the parity buffer memory 845 (e.g., OPB1, OPB2, and OPB3) as background operations in response to detecting the write operations, so that write operations to the memory 140 are not interrupted by the parity engine 125, or the like. The scheduler of the controller 160 may schedule one or more proactive recovery operations for blocks or other regions of memory 140 with latency settings that satisfy a latency threshold.

Using the example sizes of open blocks described above with respect to FIG. 2, in one embodiment, the parity buffer memory 845 may be configured to have a size sufficient to hold a portion of parity (e.g., two bins of parity data) where each bin has a size of 16 kB for a total of 32 kB. Since the parity region of each open block in the examples describe above includes 48 bins of 16 kB each, the parity data accumulated in the parity buffer memory 845 may be copied to a temporary block of parity memory (e.g., parity temp block 807) as the parity buffer memory 845 that holds the predetermined portion (e.g., two bins worth) of parity data 815 becomes full.

In some embodiments, parity temp block 807 may be an SLC block that has a size which depends on the technology node of the memory 140. For example, in one embodiment, the parity temp block 807 has a size of 12 MB for a particular technology node. In another embodiment, the parity temp block 807 has a size of 18 MB, for another technology node. In another embodiment, the parity temp block 807 has a size of 24 MB for a further technology node.

In some embodiments, a scan complete pointer 830 marks an address in an open block being scanned (e.g., OPB2 825) which indicates the point up to which the open block has been scanned. As depicted in FIG. 8, in some embodiments, a portion 820 of the written data has been scanned (e.g., accumulated) in the parity data 815 through XOR operations 840. Foreground operations may result in the background operations being suspended until the foreground operations have been completed, or the like. Thus, the scan complete pointer 830 may continue to point to a certain address until the scanning operations scheduled as background operations resume. When the background operations are resumed, they may begin at the address of the open blocks pointed to by scan complete pointer 830 and continue scanning the block to compute parity data for the remaining data 835 which has been written by the foreground write operations which has not yet been scanned by the background operations, or the like.

Figure 9:
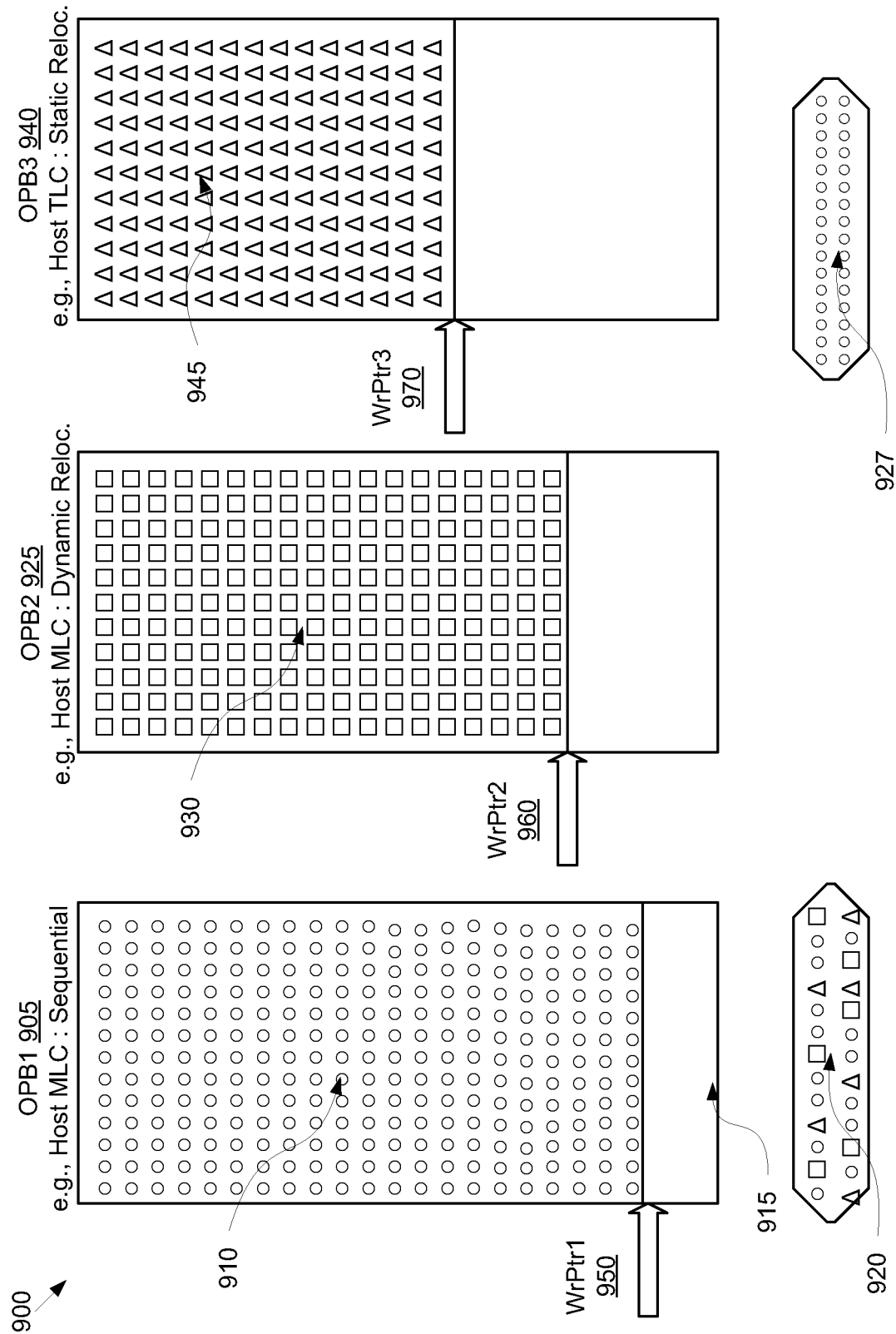
FIG. 9 is a schematic block diagram illustrating one embodiment of scanning open blocks to remove corresponding parity data.

FIG. 9 is a schematic block diagram 900 illustrating determining whether to generate non-combined parity data 927 by scanning remaining open blocks (e.g., OPB2 925 and OPB3 940) to remove corresponding parity data, to remove parity data for invalid data, or the like from the combined parity data 920 or by rescanning the one block (e.g., OPB1 905) the controller 160 determines to close.

In some embodiments, the parity engine 125 uses write pointers that in some embodiments may help determine whether a written portion 910 of the one block 905 is less than a total of written portions 930, 940 of a remainder of the plurality of open blocks OPB2 925, OPB3 940. In some embodiments, the parity engine 125 determines whether the written portion 910 of the one block 905 is less than the total of the written portions of the remaining open blocks 925, 940 by determining whether a write pointer 950 for the one block 905 is less than a sum of write pointers 960, 970 for the remainder of the plurality of open blocks.

If the written portion 910 of the one block 905 is less that the total of the written portions of the remaining open blocks 925, 940, then in response, the parity engine 125 may generate the non-combined parity data 927 for the one block of memory 905 (e.g., OPB1 905) by re-scanning the one block of memory 905 to directly calculate the non-combined parity data 927 for the parity region 915 of the one block of memory OPB1 905.

In other words, if it takes more operations, time, and/or resources, to perform reverse parity operations on the remaining open blocks OPB2 925, OPB3 940 to remove corresponding data for the remaining open block from the combined parity data 920 than it does to rescan the one block OPB1 905, then the parity engine 125 may directly compute non-combined parity data 927 by rescanning the one block OPB1 905 to directly compute the non-combined parity data 927, or the like.

In some embodiments, if the written portion 910 of the one block 905 is not less than the total of the written portions of remaining block 925, 940, then the parity engine 125 performs reverse parity operations on the combined parity data 920 with the written portions of data 930, 945 of OPB3 925, OPB3 940 to remove the corresponding parity data leaving only non-combined parity data 927 for the one block OPB1 905. Thus, the parity engine 125, in the depicted embodiment, may reduce the performance impact of the reverse parity operations in circumstances under which those reverse parity operations would take more time than directly calculating the non-combined parity data for the one block the parity engine 125 determined to close.

Figure 10:
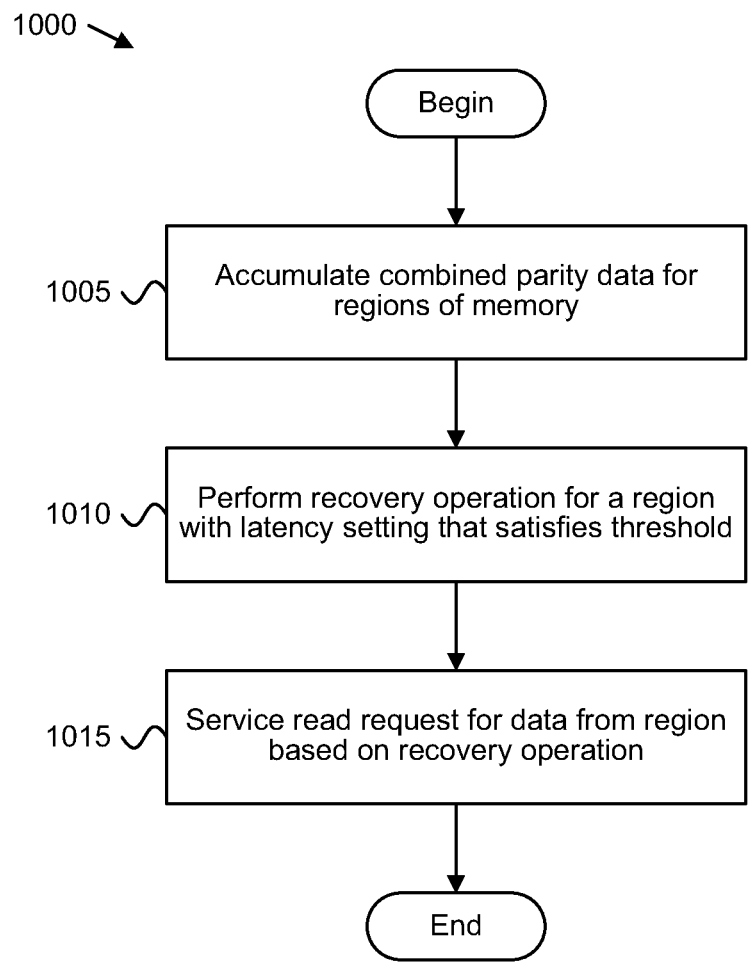
FIG. 10 is a schematic flow chart diagram illustrating one embodiment of a method for low latency parity for a memory device.

FIG. 10 is a schematic flow chart diagram illustrating one embodiment of a method 1000 for low latency parity for a memory device 100. A controller 160 accumulates 1005, in a memory buffer 120, combined parity data for a plurality of regions of memory 140 of a memory device 100 in response to write operations for the plurality of regions of memory 140.

A controller 160 performs 1010 a recovery operation for a region of memory 140 in response to determining that a latency setting for the region satisfies a latency threshold. A controller 160 services 1015 a read request for data from the region of memory 140 based on the recovery operation to satisfy the latency setting and the method 1000 ends.

Figure 11:
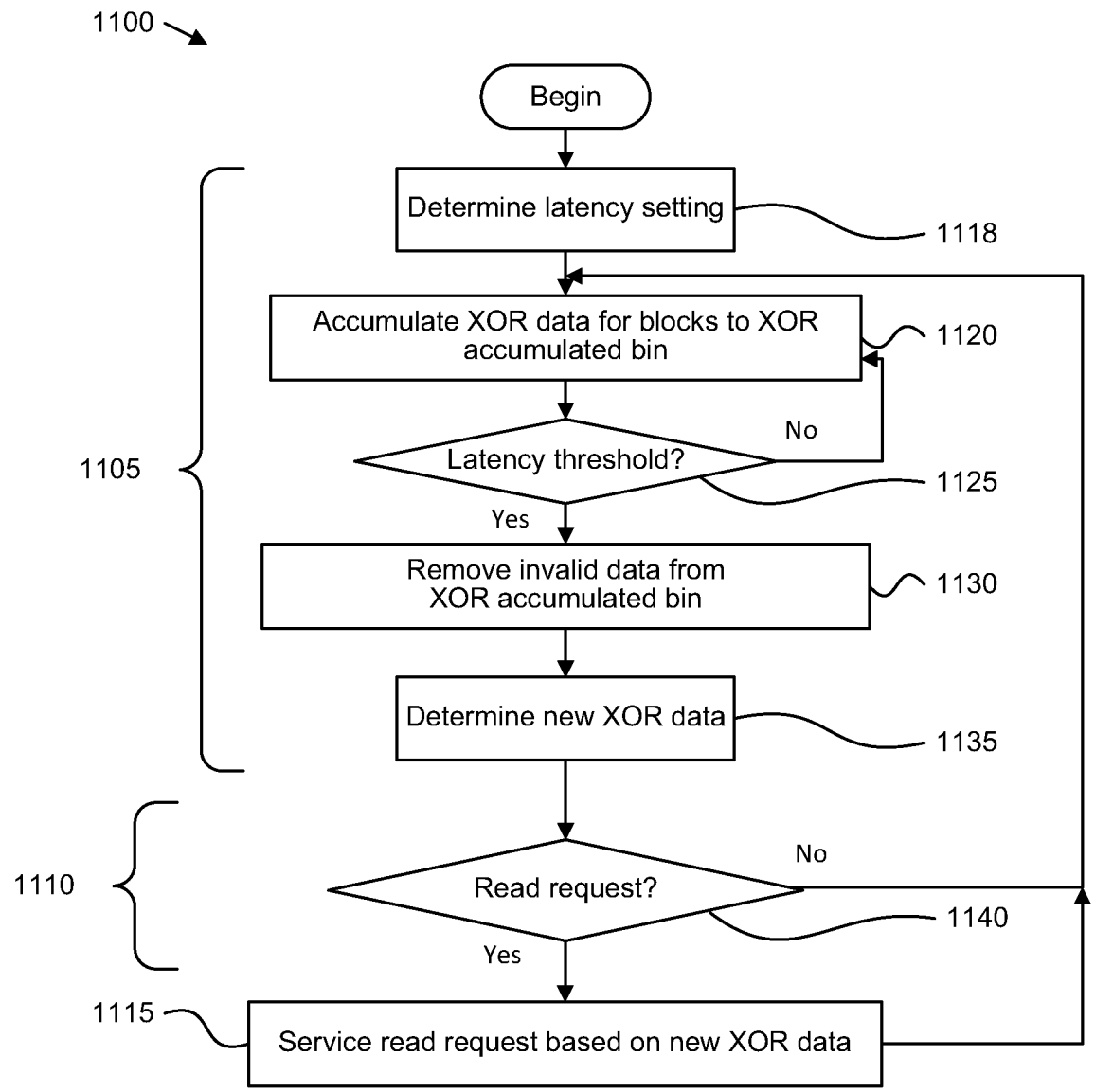
FIG. 11 is a schematic flow chart diagram illustrating another embodiment of a method for low latency parity for a memory device.

FIG. 11 is a schematic flow chart diagram illustrating one embodiment of a method 1100 for low latency parity for a memory device 100. In the depicted embodiment, the method 1100 includes a controller 160 performing a proactive recovery operation step 1105, receiving a read request 1110, and servicing 1115 the read request based on the proactive recovery operation step 1105.

The method 1100 begins and the controller 160 determines 1118 a latency setting for a block or other region of memory 140. The controller 160 accumulates 1120 XOR or other parity data for a plurality of blocks or other regions of memory 140 to a parity bin 210. The controller 160 determines 1125 whether the determined 1118 latency setting for the block or other region of memory 140 satisfies a latency threshold. If the controller 160 determines 1125 that the latency setting does not satisfy the latency threshold, the controller 160 continues to accumulate 1120 the XOR or other parity data for subsequent writes, or the like.

If the controller 160 determines 1125 that the latency setting satisfies the latency threshold, the controller 160 removes 1130 invalid data of the block from the accumulated parity bin 210 and determines 1135 new XOR or other parity data from the remaining valid data of the block. The controller 160 determines 1140 whether a read request has been received and if the controller 160 determines 1140 that a read request has been received, the controller 160 services 1115 the read request based on the recovery operation 1105 in order to satisfy the determined 1118 latency setting. The method 1100 continues for subsequent read and write requests.

A means for accumulating, in a memory buffer 120, combined parity data for a plurality of blocks or other regions of memory 140 in response to write operations, in various embodiments, may include one or more of a memory device 100, a controller 160, a parity engine 125, a memory buffer 120, an error correction engine 175, a host computing device 105, a memory 150, 115, 130, firmware 155, a processor 145, other logic hardware and/or computer program code stored on a non-transitory computer readable storage medium, or the like. Other embodiments may include similar or equivalent means for accumulating, in a memory buffer 120, combined parity data for a plurality of blocks or other regions of memory 140 in response to write operations.

A means for performing a recovery operation for a block or other region of memory 140 in response to determining that a latency setting satisfies a latency threshold, in various embodiments, may include one or more of a memory device 100, a controller 160, a parity engine 125, a memory buffer 120, an error correction engine 175, a host computing device 105, firmware 155, a processor 145, other logic hardware and/or computer program code stored on a non-transitory computer readable storage medium, or the like. Other embodiments may include similar or equivalent means for performing a recovery operation for a block or other region of memory 140 in response to determining that a latency setting satisfies a latency threshold.

A means for servicing a read request for data from a block or other region of memory 140 based on a recovery operation to satisfy a latency setting, in various embodiments, may include one or more of a memory device 100, a controller 160, a parity engine 125, a memory 140, a host interface module 110, a flash interface module 135, firmware 155, a processor 145, other logic hardware and/or computer program code stored on a non-transitory computer readable storage medium, or the like. Other embodiments may include similar or equivalent means for servicing a read request for data from a block or other region of memory 140 based on a recovery operation to satisfy a latency setting.

A means for removing invalid data of at least a block or other region of memory 140 from combined parity data, in various embodiments, may include one or more of a memory device 100, a controller 160, a parity engine 125, a memory buffer 120, a processor 145, firmware 155, other logic hardware and/or computer program code stored on a non-transitory computer readable storage medium, or the like. Other embodiments may include similar or equivalent means for removing invalid data of at least a block or other region of memory 140 from combined parity data.

A means for determining new parity data for remaining valid data from at least a block or other region of memory 140, in various embodiments, may include one or more of a memory device 100, a controller 160, a parity engine 125, a memory buffer 120, an error correction engine 175, a host computing device 105, a memory 150, 115, 130, firmware 155, a processor 145, other logic hardware and/or computer program code stored on a non-transitory computer readable storage medium, or the like. Other embodiments may include similar or equivalent means for determining new parity data for remaining valid data from at least a block or other region of memory 140.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   a controller for a memory device, the controller configured to:
   accumulate, in a memory buffer, combined parity data for a plurality of regions of memory of the memory device in response to write operations for the plurality of regions of memory;
   perform a recovery operation for a region of the plurality of regions in response to determining that a latency setting for the region satisfies a latency threshold, the recovery operation performed proactively, prior to receiving a read request, wherein the latency setting comprises a disabled extended error recovery setting; and
   service the read request for data from the region based on the recovery operation to satisfy the latency setting.

2. The apparatus of claim 1, wherein the recovery operation for the region comprises a reverse parity operation to recover the data from the region.

3. The apparatus of claim 2, wherein the recovery operation for the region further comprises:
   removing invalid data of at least the region of the plurality of regions from the combined parity data; and
   determining new parity data for remaining valid data from at least the region of the plurality of regions, the read request being serviced using the new parity data.

4. The apparatus of claim 1, wherein accumulating the combined parity data comprises one or more XOR operations and the recovery operation comprises one or more reverse XOR operations.

5. The apparatus of claim 1, wherein the latency setting comprises a read recovery level setting.

6. The apparatus of claim 5, wherein the read recovery level setting comprises a fast fail level providing a minimum level of recovery.

7. The apparatus of claim 6, wherein the fast fail level comprises a Non-Volatile Memory Express (NVMe) read recovery level of fifteen, and higher levels provide less recovery than preceding lower levels for the read recovery level setting.

8. The apparatus of claim 1, wherein the controller is configured to automatically determine the latency setting for the region based on a type of data stored by the region.

9. The apparatus of claim 1, wherein the controller is configured to receive the latency setting for the region from a host computing device.

10. The apparatus of claim 1, wherein the controller is configured to perform recovery operations for different regions of the memory device at different frequencies based on different latency settings for the different regions.

11. A method comprising:
    accumulating, in a memory buffer, combined parity data for a plurality of blocks of memory of a memory device in response to write operations for the plurality of blocks of memory;
    performing a recovery operation for a block of the plurality of blocks in response to determining that a latency setting for the block satisfies a latency threshold, the recovery operation performed proactively, prior to receiving a read request, wherein the latency setting comprises a disabled extended error recovery setting; and
    servicing the read request for data from the block based on the recovery operation to satisfy the latency setting.

12. The method of claim 11, wherein the recovery operation for the block further comprises:
    removing invalid data of at least the block of the plurality of blocks from the combined parity data; and
    determining new parity data for remaining valid data from at least the block of the plurality of blocks, the read request being serviced using the new parity data.

13. The method of claim 11, further comprising automatically determining the latency setting for the block based on a type of data stored by the block.

14. The method of claim 11, further comprising receiving the latency setting for the block from a host computing device.

15. The method of claim 11, further comprising performing recovery operations for different blocks of the memory device at different frequencies based on different latency settings for the different blocks.

16. An apparatus comprising:
    means for accumulating, in a memory buffer, combined parity data for a plurality of blocks of non-volatile memory of a non-volatile memory device in response to write operations for the plurality of blocks of non-volatile memory;
    means for performing a recovery operation for a block of the plurality of blocks in response to determining that a latency setting for the block satisfies a latency threshold, the recovery operation performed proactively, prior to receiving a read request, wherein the latency setting comprises a disabled extended error recovery setting; and
    means for servicing the read request for data from the block based on the recovery operation to satisfy the latency setting.

17. The apparatus of claim 16 further comprising:
    means for removing invalid data of at least the block of the plurality of blocks from the combined parity data; and means for determining new parity data for remaining valid data from at least the block of the plurality of blocks, the read request being serviced using the new parity data.

* * * * *